United States Patent [19]

Graham et al.

[11] Patent Number: 5,382,270
[45] Date of Patent: Jan. 17, 1995

[54] PLANT GROWTH MEDIA COMPRISING CROSS-LINKED HYDROGEL PARTICLES

[75] Inventors: Neil B. Graham, Glasgow; Robert A. K. Szmidt; Ralph C. Kirkwood, both of Ayr, all of Scotland

[73] Assignee: University of Strathclyde, Glasgow, Scotland

[21] Appl. No.: 118,259

[22] Filed: Sep. 9, 1993

Related U.S. Application Data

[62] Division of Ser. No. 613,913, Feb. 8, 1991, Pat. No. 5,273,066.

[30] Foreign Application Priority Data

Jun. 10, 1988 [GB] United Kingdom ............... 8813837
Jun. 10, 1988 [GB] United Kingdom ............... 8813839

[51] Int. Cl.$^6$ ............. A01G 29/00; A01G 31/00; A01B 79/00; A01C 1/00
[52] U.S. Cl. .................................. 47/58; 47/48.5; 47/59
[58] Field of Search ............... 47/58.26, 58.27, 59, 47/62, 58, 48.5

[56] References Cited

U.S. PATENT DOCUMENTS

5,273,066 12/1993 Graham et al. .................... 137/78.3

FOREIGN PATENT DOCUMENTS

0122797 10/1983 European Pat. Off. .
2611725 2/1985 France .
61227715 4/1985 Japan .

OTHER PUBLICATIONS

Salisburg et al. 1978. Plant Physiology. Second Edition. pp. 61 & 80–81.

*Primary Examiner*—David T. Fox
*Assistant Examiner*—Erich E. Veitenheimer
*Attorney, Agent, or Firm*—Breiner & Breiner

[57] ABSTRACT

The invention provides a method of plant growing in which method one or more plants are grown in a growing medium comprising hydrogel particles charged with aqueous nutrient solution for the plant and plants, the growing medium being housed in a substantially water-impermeable container and the plants extending out of the container, and, when the water content within the hydrogel particles falls below a predetermined level, introducing further nutrient solution into the container.

5 Claims, 3 Drawing Sheets

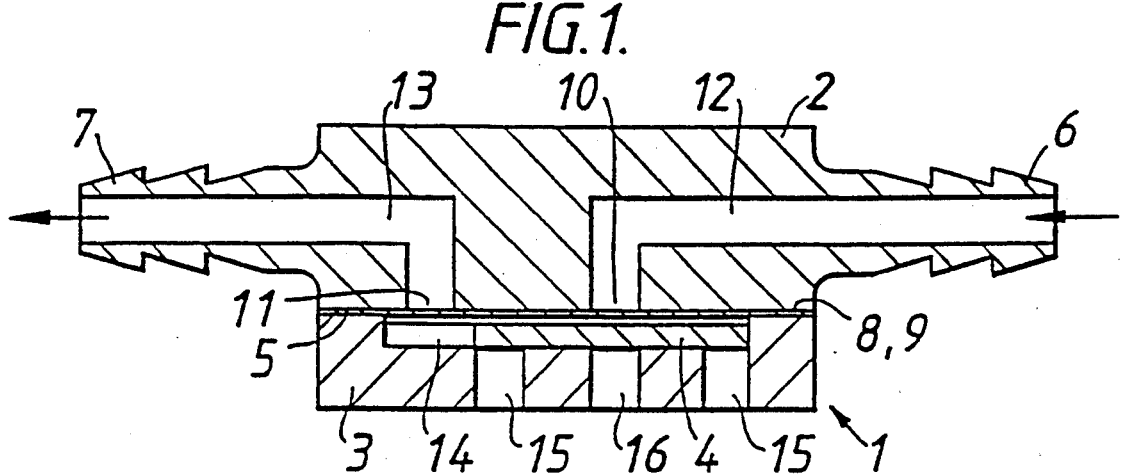
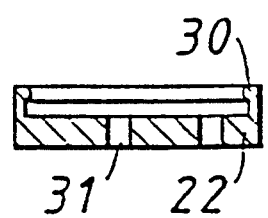
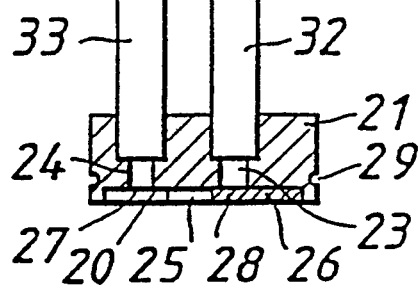

PLANT GROWTH MEDIA COMPRISING CROSS-LINKED HYDROGEL PARTICLES

This is a division of application Ser. No. 07/613,913 filed Feb. 8, 1991, now U.S. Pat. No. 5,273,066.

FIELD OF THE INVENTION

This invention relates to control valves, more particularly to moisture sensitive control valves, for control of fluid flow and to methods of plant growing using control of fluid flow and to an apparatus for use therein.

Valves which utilise a moisture sensitive material to control flow between an inlet and an outlet of the valve are known. The moisture sensitive material absorbs moisture and swells and this swelling is used to close the valve. Drying of the moisture sensitive material causes it to contract and this contraction in turn is used to open the valve. These valves are particularly (but not exclusively) useful for plant growing systems in which water for the plants needs to be accurately controlled, so that the plants do not become too dry due to lack of water or suffer from overwatering. In such an implementation, the valve is positioned in the vicinity of the plants and operates to control the feed of water to the plants.

In U.S. Specification 3426539, a moisture sensitive valve using redwood bark as moisture sensitive material is described. This material is connected to movable jaws which compress a flexible water-carrying tube passing between them. Water flow is controlled by the degree of compression of the tube. As the bark dries out, it contracts moving the jaws apart and releasing the compression on the tube.

British Patent Specification 2017868A describes an irrigation valve device of pinch cock or diaphragm type using a swellable member to control response to moisture content.

British Patent Specification 1006801 discloses the use of vegetable fibres to compress a flexible tube directly. The fibres are held together by a ring, and, as they swell, the tube is compressed to restrict the water flow. As the fibres dry out, the pressure on the tube is released allowing water to flow more freely therethrough.

German Offenlegungsschrift 2513600 and 2325980 both disclose the use of a resilient water impermeable membrane to seal the outlet of the valve.

In Offenlegungsschrift 2325980, the impermeable membrane is deflected by a moisture absorbing material to compress a resilient porous material situated over the outlet. As the moisture absorbing material expands, it acts to deflect the membrane compressing the porous material to seal off the outlet. As the moisture absorbing material dries out, the resilience of the porous material and the membrane moves them away from the outlet allowing water to flow through the porous material to the outlet.

In Offenlegungsschrift 2513600, the water impermeable membrane is operated by pressure in the system. In this case, water flows from the inlet to the outlet on one side of a water impermeable membrane deflecting it due to the system pressure. The moisture absorbing material is connected to a valve on the side of the membrane remote from the inlet and outlet, and as the moisture absorbing material expands, the valve is closed allowing pressure to be built up on this side of the membrane until it reaches a value which forces the membrane against the outlet to seal off the water flow. As the moisture absorbing material contracts, the valve is re-opened reducing the pressure on that side of the membrane to allow the system pressure to deflect the membrane and allow water to flow from the inlet to the outlet.

U.S. Specification 3204872 discloses a diaphragm valve which is operated by moisture sensitive material in the form of a strip of wood which, as it expands, deflects a resilient diaphragm and holds it against the valve inlet blocking off the water supply. As the wood dries out, the diaphragm is no longer held against the inlet and returns to its original shape allowing water to flow freely.

U.S. 4696319 describes moisture-activated apparatus for controlling the flow of water. Expansion on absorption and contraction on desorption of water by a water-swellable material is used cause the valve stem of the valve to move between closed and open positions.

French Specification 2345894 discloses a diaphragm valve in which a resilient diaphragm is held over the valve inlet to cut off the water supply. The diaphragm is operated by means of a pin connecting it to the moisture absorbing material (in this case wood). As the wood dries out, the pin is retracted and the diaphragm returns to its undeflected position allowing water to flow from the inlet to the outlet.

European Patent Specification 0004159 discloses the use of a high swelling hydrogel provided around a flexible tube, which hydrogel acts directly on the flexible tube to compress it as the hydrogel absorbs moisture. In this embodiment, the hydrogel acts in a similar manner to the vegetable fibres of British Patent Specification 1006801. In a further embodiment, the high swelling hydrogel expands to operate a piston or movable jaw which compresses the flexible tube against a fixed surface. Also disclosed in this specification, is the use of a resilient water impermeable membrane which operates in association with the conical surface of a conical piston, the piston and therefore the membrane being moved by the hydrogel as it expands to seal off the water inlet.

If natural materials are used such as wood or vegetable fibres, the valve tends to be bulky as a relatively large amount of material is needed to provide the desired sensitivity and control of the valve is not very accurate. If synthetic hydrogels of European Patent Specification 0004159 are used, the valve tends to be bulky as the materials used tend to have very high absorption swelling rates, at least 25 times their original size. Furthermore, the valve tends to comprise several components making it both labour intensive and expensive to produce.

Where plants, e.g. crops, are grown on a commercial scale, the maintaining of the correct water and nutrient supply needs much attention. It also requires much financial investment in apparatus even where water supply is adequate. In those parts of the world having low rainfall, water conservation is also important and losses by evaporation can be considerable.

It is known to cultivate plants in non-soil media, e.g. U.S. Pat. No. 4,463,522 and British Patent Specficiation 2194124A, and hydroponically; that is the plants are grown not in soil but in an aqueous solution of the required nutrients. Hydroponic cultivation is successfully used commercially in many parts of the world, including those where rainfall may be low. This method of cultivation does offer control on the amount of water used, but still this amount can be large and the financial investment in equipment large also.

It is also known to grow plants in hydrogel media (e.g. European Patent Specification 0072214A). Hydrogels are materials which swell by the absorption of water. Thus plants may be grown within a medium of hydrogel granules swollen by aqueous nutrient solution. The hydrogel serves to support the plants and the aqueous nutrient medium which of course has to be supplemented from time to time, feeds the plants. As with conventional hydroponic systems, large amounts of water are required and the financial investment in equipment can be large.

Another method of growing plants which does not involve their being grown directly in the ground, employs soil, compost, raw peat etc. contained in substantially water-impermeable containers, e.g. pots, plastics sacks. Plastics sacks offer a very convenient method to the generally domestic, rather than commercial, market for growing plants on a fairly small scale. The plants are planted in the growing medium through holes pierced in the plastics sack outer and, provided the holes are not too large, the plastics outer does serve to prevent too much water loss from the sack by evaporation. However, watering of the growing medium in the sacks is not convenient and over-watering can result in waterlogging of the plants.

SUMMARY OF THE INVENTION

According to a first aspect of the invention, there is provided a control valve having an inlet and an outlet, and including a sensitive actuator element, which is swellable on the absorption of fluid and contractable on loss of absorbed fluid, the actuator element being sealed from the inlet and outlet by a moisture impermeable flexible film, a fluid flow connection being formed between the inlet and the outlet when the film is deflected by fluid pressure at the inlet, the actuator element being arranged such that, when it swells by absorption of fluid, pressure is exerted on the film and the fluid flow connection between the inlet and the outlet is prevented.

Suitably the sensitive actuator element is arranged in a chamber in the valve sealed from the inlet and the outlet by the impermeable film. The actuator element must of course be in communication with the environment of the valve. When it absorbs fluid from the environment and swells, the actuator element acts on the flexible film to prevent it being deflected by fluid pressure and the inlet and thus the valve, becomes closed. When the fluid content of the environment is reduced and fluid is lost from the actuator element, the actuator element contracts and thus the force exerted on the flexible film by the actuator element is reduced. When this is reduced to such an extent that the film is deflected by the fluid pressure of the inlet, the fluid flow connection is re-established and the valve is opened. A preferred material for the sensitive actuator element is a hydrogel.

According to a second aspect of the invention, there is provided a control valve having an inlet and and outlet, and including, as a sensitive actuator element, a hydrogel member arranged in a chamber and sealed from the inlet and the outlet by a moisture impermeable flexible film, the hydrogel being capable of swelling with increasing environmental moisture levels to act on the flexible film to seal off a fluid flow connection between the inlet and the outlet.

The valve according to the present invention employs changes in the fluid conditions of the environment of the valve to open and close it. When the environment is high in fluid, usually moisture, fluid is absorbed by the sensitive actuator element, causing it to swell and the flexible film is acted on (preferably directly by the actuator element) to prevent fluid flow between the inlet and outlet of the valve. When the fluid in the environment decreases, the actuator element loses fluid and contracts. In this way, the force on the flexible film is reduced and the fluid connection becomes re-established. By using actuator elements of determined swellability and geometry, the response values of the control valve according to the present invention can be accurately determined.

The valves of the present invention can be of very simple construction requiring a minimum of parts.

Important to the successful operation of the valve according to the present invention is the sensitive actuator element. For a rapid response valve, this needs to be made of a suitably rapid responding material. Any suitable, generally moisture, absorbing material with sufficiently rapid response time can be used. Also, especially where the actuator element acts directly on the film to prevent fluid flow connection, the swollen material requires sufficient strength to ensure that the valve is properly closed.

The preferred actuator material is a hydrogel. Clearly the hydrogel needs to have sufficient swelling to ensure adequate response. On the other hand it should preferably not be too highly swelling since generally speaking with increased swelling, strength of the swollen hydrogel is lost. Preferably therefore, a hydrogel is used which has a maximum swelling (at 20° C.) of up to 10 times its dry size, for example up to 5 times its dry size. Preferred maximum swelling is between 2 and 5 times dry size, e.g. between 2 and 3 times. Generally speaking, a hydrogel swelling less than 20 times its dry weight with water is used.

Conveniently, the hydrogel may be used in the form of a flat sheet, preferably a disc, which may simply be placed in the chamber as the valve is assembled. For a particularly rapid response valve, there may be used the rapid edge-swelling of a rigid dry hydrogel disc to promote rapid and effective fluid flow cut off.

The hydrogels can be of natural or synthetic organic or inorganic material. They are normally made of water soluble backbone materials which are rendered insoluble by the introduction of covalent crosslinks e.g. addition polymers of hydroxy alkyl(meth)acrylates, methyl vinyl ether, (meth)-acrylamide, N-vinyl pyrrolidone, (meth)acrylic acid and its salts, N-vinyl and C-vinyl pyridines and salts thereof with poly(meth)acrylates such as glycol dimethacrylate. There may also be used crosslinked natural polymers such as collagen or starch and cellulose derivatives, and crosslinked synthetic polymers such as polyvinyl alcohol.

Preferably there is used as hydrogel a cross linked poly(ethylene glycol or ethylene oxide). Suitable crosslinked materials can be prepared by reacting poly(ethylene oxide) or poly(ethylene glycol) with a polyol (e.g. 1,2,6-hexantriol) and a polyisocyanate (e.g. diphenylmethane 4,4'-diisocyanate). Further there may be used insoluble domains (block copolymers of e.g. polyethylene oxide with water-insoluble urethane blocks) or materials rendered insoluble by entanglement crosslinking (high molecular weight poly(ethylene oxides)) with divinylbenzene or by crystallinity (cellulosic materials). The most preferred hydrogel for use according to the present invention is a cross linked, partially crystalline poly(ethylene oxide).

The moisture impermeable flexible film used in the valve according to the present invention may be made of any suitable water impermeable, flexible material. Suitable of such materials include polyethylene and polyvinylchloride.

A particular advantage of the present invention is the simplicity of construction of the valve. The valve will generally comprise just four parts; two body portions, the flexible film and the, for example disc of, hydrogel. Both body portions are conveniently injection moulded and then assembled with the hydrogel and the film between the two portions, the hydrogel being sealed from the inlet and outlet by the film. Indeed, the two body portions can, if desired, be moulded as a single item and folded round, with the hydrogel and film between to form the assembled valve.

Advantageously, the valve, when assembled, is ultrasonically welded to join the two body portions together retaining the film and hydrogel in place. Alternatively, the portions may be fixed together using a suitable adhesive.

Body portions may be made from any suitable thermoplastics material, but it is preferable that the two body portions are made of the same material. For example, there may be used polyethylene, polypropylene, nylon or polystyrene. Preferably, the film is also made of the same material as the body portions, but it may be of a different grade.

Suitably one of the body portions includes a plurality of apertures which allow the environmental moisture to contact the hydrogel in the assembled valve.

In another embodiment, the inlet and outlet may be in the form of concentric tubes, e.g. catheter tubing, making the valve particularly suitable for minaturisation. The impermeable film is provided across the end of the tubing, hydrogel is provided on the side of the film remote from the tubing and they are held in place by a cap. Swelling of the hydrogel forces the film down on to the end of the tubing preventing flow between the concentric tubes. When the hydrogel contracts on drying flow between the tubes is permitted under the film.

The valve according to the present invention can be used in the controlling of, for example, watering of plants as disclosed in Patent Specifications described above. It may also be used in, for example, the control of the supply of water or plant nutrient solution to plants using the plant growing system forming the third aspect of this invention described below. Alternatively the valve may be used in a switching device of a large irrigation system, whereby fluid flow through the valve (as a result of dry conditions) is used to switch on the large irrigation system. Furthermore, the valve may be used in other environments where changes in the environmental conditions cause changes in the swelling/contraction of an appropriate actuator element material to open and close the valve.

According to the third aspect of the present invention, there is provided a method of plant growing, in which method one or more plants are grown in a growing medium comprising hydrogel particles charged with aqueous nutrient solution for the plant or plants, the growing medium being housed in a substantially water-impermeable container and the plants extending out of the container, and, when the water content within the hydrogel particles falls below a predetermined level, introducing further nutrient solution into the container.

The invention also provides apparatus for use in plant cultivation which apparatus comprises a water-impermeable container housing a plant growing medium comprising hydrogel particles, a supply line for feeding nutrient solution to the growing medium in the container, and a control valve in the supply line, which control valve is closed when the water content of the hydrogel particles is above a predetermined level and is open when the water content is below the predetermined level.

The present invention offers the opportunity of simple, effective, and readily controllable plant growing at relatively low cost.

The container for the growing medium may be any suitable one. For example the growing medium may be housed in rigid, semi-rigid or flexible envelopes, troughs, e.g. dug in the ground, or pots of plastics, metal or natural materials such as clay, or other containers having an external or in-built reservoir which may be controlled. It is preferred that the growing medium should not, in use, have an appreciable exposed surface, especially in locations where water supply is restricted. In this way water loss by evaporation may be kept to a minimum.

A particularly convenient form of container is a plastics sack. The growing medium is housed in the plastics sacks and holes are, e.g., pierced through the sack wall for planting the plants in the growing medium. Suitably the holes should be just large enough for this purpose. By keeping hole size to a minimum, evaporation loss from the growing medium to the atmosphere can be kept to a minimum, which is especially important in high temperature/low rainfall countries.

If desired the container for the growing medium may itself be degradable.

The hydrogel used according to this aspect of the present invention must of course be water-insoluble. The hydrogel must not be too greatly swelling. It is important that, with the fully swollen hydrogel within the container, capillary channels between the hydrogel particles are retained. In this way, air flow to the plant roots is possible. Otherwise the growing system may become anaerobic and water logged.

The growing medium may consist of entirely hydrogel particles. However this may be too expensive. Thus generally the hydrogel will be mixed with at least one other growing medium. Preferably the hydrogel will be mixed with a nutritionally inert medium.

Growing media which can be used with the hydrogels include soil, peat based, chemical based, (e.g. polyformaldehyde or urea-formaldehyde) or mineral based (e.g. sand, gravel, perlite, bentonite, rockwool fibres, vermiculite or zeolite) materials. The mixed growing medium should also be hydroporous and capillarity is again important.

Generally speaking the growing medium will contain 0.5 to 100% by weight of hydrogel.

The ability of the growing medium to take up and release moisture, e.g. to the growing plants, is important. This ability may be expressed in terms of the moisture tension of the growing medium. The optimum moisture tension will vary according to the plant/medium combination. However generally the preferred moisture tension for the growing medium would be approximately $-0.01$ megapascal (MPa). Depending on the crop/growing medium combination in practice this value is likely to be in the range −0.01 MPa to −0.03 MPa.

As mentioned above, the hydrogel used should not be too greatly swelling. Generally the hydrogel have a degree of swelling, from dry, of less than 25 times and preferably between 5 and 10 times by volume with water. The hydrogel may be any suitable water-insoluble one with the required degree of swelling. The hydrogels can be of natural or synthetic organic or inorganic material. They are normally made of water soluble backbone materials which are rendered insoluble by the introduction of covalent crosslinks as described above.

Preferably there is used as hydrogel a crosslinked poly(ethylene glycol or ethylene oxide) as described above. Particularly preferred is the use of a cross-linked partially crystalline polyethylene oxide hydrogel.

The aqueous nutrient solution should contain all the ingredients or all the additional ingredients (not within the growing medium) required by the plants for growth. In addition, it may be advantageous to include for example pesticides in the nutrient solution. An interesting aspect here is that it has been found that nutrient solutions of high salinity may be used according to the present invention and still yield good crops. This is particularly interesting in low rainfall areas where it may be possible to employ sea water, which would normally be fatal to the plants. Nutrients having a salt content of up to 32 pph have been used. Particularly preferred hydrogels here are the crosslinked polyethylene oxides.

The swollen hydrogel particles within the container used according to the present invention provide a support for the growing plant or plants and, as the nutrient medium is used up, this can readily be detected by a reduction of water content, and thus in swelling of the hydrogel particles. On detection of water content falling below a predetermined level, further nutrient solution is introduced into the container. Thus the invention offers a very easy plant growing method in which water loss may be kept to a minimum and which does not require expensive and complicated apparatus.

Important to the successful operation of the method according to the present invention is the means for detecting the water content of the hydrogel to activate the introduction of additional nutrient solution. In order that the method according to the present invention can be operated as a low technology/low labour cultivation system, the means needs to be simple and reliable in construction. Suitably these means are in form of a control valve in a nutrient solution supply line; the valve being situated within or in very close proximity to the container. The valve contains moisture swellable material which, when wet, as when the moisture contained in the container is high, is swollen to close the nutrient solution supply line. However in dry conditions, the swellable material shrinks and the supply line becomes open. In this way, when the hydrogel in the growing medium becomes dried, the swellable material in the valve (which may incidentally also be of a hydrogel) will also become dry and reduce in size to open the nutrient solution supply line whereby further nutrient solution will be introduced into the container. The introduction of nutrient solution will continue until such time as the swellable material of the valve (and therefore also of the hydrogel particles of the growing material) are at a predetermined amount whereby the swellable material will to close the valve and supply will be ended until the level falls again to below the predetermined amount.

Suitable means for controlling the water content of the growing medium are described for example in European Patent No. 0004159 and the control valve of the present invention.

The method and apparatus of the invention are suitable for use in growing a wide range of edible and non-edible crops e.g. for fresh or processed culinary and medicinal use. These include the following:

(1) salad crops e.g. tomatoes, cucumbers, peppers, lettuce, brassica species (2) cut flowers, e.g. chrysanthemum, carnation, alstromeria, gerbera, freesia (3) medicinal herbs (4) culinary herbs (5) nursery stock, i.e. trees and shrubs, ornamental foliage and flowering "pot plant" species.

For a better understanding of the invention, reference will now be made, by way of example only, to the accompanying drawings and in the Examples which follow.

BRIEF DESCRIPTION OF THE DRAWINGS

FIG. 1 is a sectioned side elevation of a control valve according to the invention;

FIG. 2 is a section through the body portion of a second embodiment of a control valve according to the invention with the moisture responsive element in position and also inlet and outlet tubes connected to the valve;

FIG. 3 is a section through the cap portion of the second embodiment;

DESCRIPTION OF THE PREFERRED EMBODIMENTS

Figure 4:
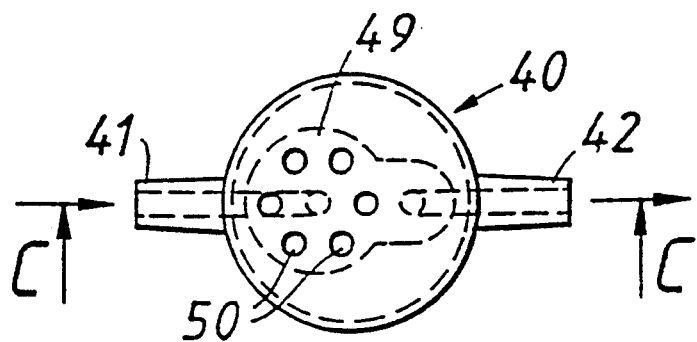
FIG. 4 is a plan view of a third embodiment of a control valve according to the invention.

A first embodiment of a control valve is shown in FIG. 1. The valve 1 comprises a first body portion 2, a cap body portion 3, a hydrogel disc element 4, and a water impermeable flexible film 5.

The body portion 2, moulded in plastics, is generally circular in cross-section and has an inlet duct 6 and an outlet 7 formed in it, the inlet and outlet being diametrically opposed as shown. The body portion 2 has a substantially flat face 8 in which are provided inlet and outlet ports 10 and 11 respectively connected to respective ones of the inlet 6 and the outlet 7 by means of passages 12 and 13.

The water impermeable flexible film 5 is provided over surface 8, the film being secured to the surface 8 around its periphery 9 and extending across the inlet and outlet ports 10 and 11.

The cap portion 3 has a cavity 14 in which the element 4 is placed. Furthermore, in use, the film 5 is deflected into this cavity 14 by the pressure of inlet water to allow communication between the inlet and outlet ports, 10 and 11 respectively to be achieved. A plurality of holes 15 (only two shown) are provided in the cap portion on a circumference of a circle having at its centre a hole 16. The hole 16 is positioned so that it aligns with the inlet port 10 of the body portion 2 when the valve 1 is assembled. These holes 15, 16 bring the element 4 in cavity 14 into communication with the environment in which the valve is placed e.g. a growing medium, and allow moisture from that environment to contact the element 4 thereby causing it to swell or contract. The holes 15 and 16 as shown are cylindrical and of substantially constant cross-section. However other hole shapes may of course also be used. For example the holes may be tapered having a greater diameter to the exterior of the valve than adjacent to element 14.

The valve 1 is assembled by placing the film 5 onto the face 8 of body portion 2, and then placing the cap portion 3 onto the film 5. The cap portion 3 engages the film 5 around its periphery for a better seal in the final valve. In addition, the film 5 may be secured to the face 8 of the body portion 2 before the cap portion 3 is fitted. The hydrogel element 4 is placed in the cavity 14 prior to the cap portion 3 being put onto the body portion 2. The two portions forming the valve 1 can be secured together using a suitable adhesive, or they can be secured together using ultrasonic welding techniques.

In use of the valve of FIG. 1, the inlet 6 is connected to the fluid supply, e.g. a tube is connected to inlet 6 and a container for the fluid to be supplied, and e.g. a tube will be connected to outlet 7 to carry the fluid to where desired and the valve will be placed in the environment whose moisture content is to determine fluid flow. A particularly suitable application is supply of water or aqueous nutrient solution to growing plants in which case the valve will be placed within or near the growing medium.

When the valve environment is wet, the hydrogel disc 4 in the valve will be maintained in its swollen condition by moisture contacting the disc 4 through holes 15, 16 in valve cap portion 3. The swollen hydrogel disc 4 will press the flexible film 5 down against the surface 8 and across the inlet port 10 in the valve body portion 2. In this way the valve is closed with fluid being prevented from passing from inlet 6 to outlet 7 by means of the flexible film 5 pressed down to seal inlet port 10.

When the valve environment becomes dry, the hydrogel disc 4 will give off water it has absorbed and contract in size. In this condition, the pressure acting on flexible film 5 to force it down against surface 8 across inlet port 10 is decreased to open the valve. Then fluid from inlet 6 is able to pass through from inlet port 10 to outlet port 11 and thus through the valve. On an increase of the valve environment moisture content, the hydrogel disc 4 will swell again and again press film 5 down to seal inlet port 10 and close the valve.

FIGS. 2 to 3 illustrate a second embodiment of a control valve according to the invention. The valve comprises a body portion 21 and a cap portion 22.

The body portion 21 has an inlet 23 and an outlet 24. In this embodiment, the inlet and outlet 23, 24 are passages which connect via ports 26 and 27 with a cavity 25 in the body portion 21. A water impermeable film 20 is positioned to line the cavity 25 lying against the inlet and outlet ports 26, 27. A hydrogel disc 28 similar to that used in FIG. 1 is placed in the cavity 25 before the cap portion 22 is put onto the body portion 21. An external circular groove 29 is formed in the body portion 21 to receive a corresponding lip 30 formed in the rim of the cap portion 22.

The cap portion 22 contains a plurality of holes 31 through which moisture from the environment can be brought into contact with the disc 28. These holes 31 are suitably equally spaced on a circumference of a circle which has a diameter less than that of the element 28. If desired for a better seal, the cap portion 22 can be fixed to the body portion 21 using a suitable adhesive or it can be ultrasonically welded.

As shown in FIG. 2, the inlet 23 and outlet 24 can be connected to respect inlet and outlet tubes 32, 33.

In use, the valve of FIGS. 2 and 3 with the cap portion in position on the body portion, is placed in the environment whose moisture content is to determine fluid flow as for FIG. 1, tube 32 being connected to the fluid supply and tube 33 to carry the fluid to where required.

When the valve environment is wet, the hydrogel disc 28 absorbs water via apertures 31 and swells to force film 20 down against the inlet port 26 to stop fluid flow. When the environment becomes dry, the hydrogel disc 28 will contract to reduce the pressure on film 20 and thus fluid will be able to flow from the inlet to the outlet under the film.

Figure 5:
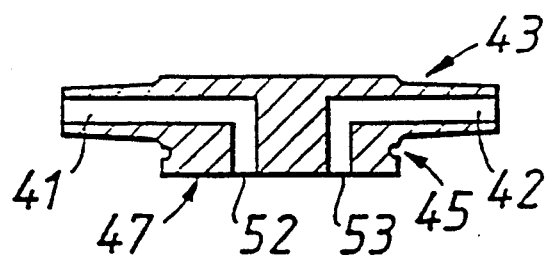
FIG. 5 is a section on C—C of FIG. 4 showing a body portion.
Figure 6:
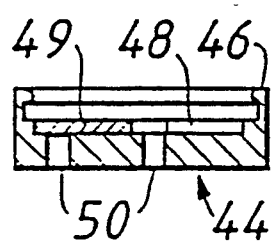
FIG. 6 is a section on C—C of FIG. 4 showing the cap portion.

FIGS. 4 to 6 illustrate a third embodiment of a control valve. Valve 40 is similar to the embodiment of FIG. 1 having an inlet 41 and an outlet 42 within a body portion 43, and a cap portion 44. Inlet 41 has a port 52 and outlet 42 has a port 53 opening into a substantially flat face 47 of the body portion 43. A circular groove 45 is formed on the exterior of the body portion 43 and engages a corresponding rib 46 formed in the lip of the cap portion 44. The cap portion has a cavity 48 in which a hydrogel disc 49 similar to that of FIG. 1 is provided. Six equally spaced holes 50 are formed in the cap portion 44 to allow moisture to come into contact with the hydrogel disc 49.

For use the valve parts are put together with a water impermeable flexible film (not shown) being placed across the face 47 of body portion 43. The film may be welded or adhered at the periphery to face 47. However it may also extend over the edges of face 47. Then, when the cap portion 44 (with hydrogel disc 49 in place) is secured to the body portion 43, the film may be held between rib 46 of the cap engaging the groove 45 of the body portion. Alternatively, the cap portion 44 can be fixed to the body portion 43 using adhesive or by ultrasonic welding.

The valve of FIGS. 4 to 6 is used in the same way as those of FIGS. 1 to 3 with the hydrogel disc 49 swelling in the presence of water to press the water impermeable film to seal inlet port 52 and close the valve.

Figure 7:
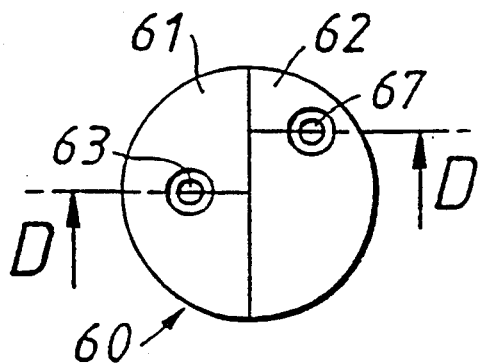
FIG. 7 is a plan view of a fourth embodiment of a control valve according to the invention.
Figure 8:
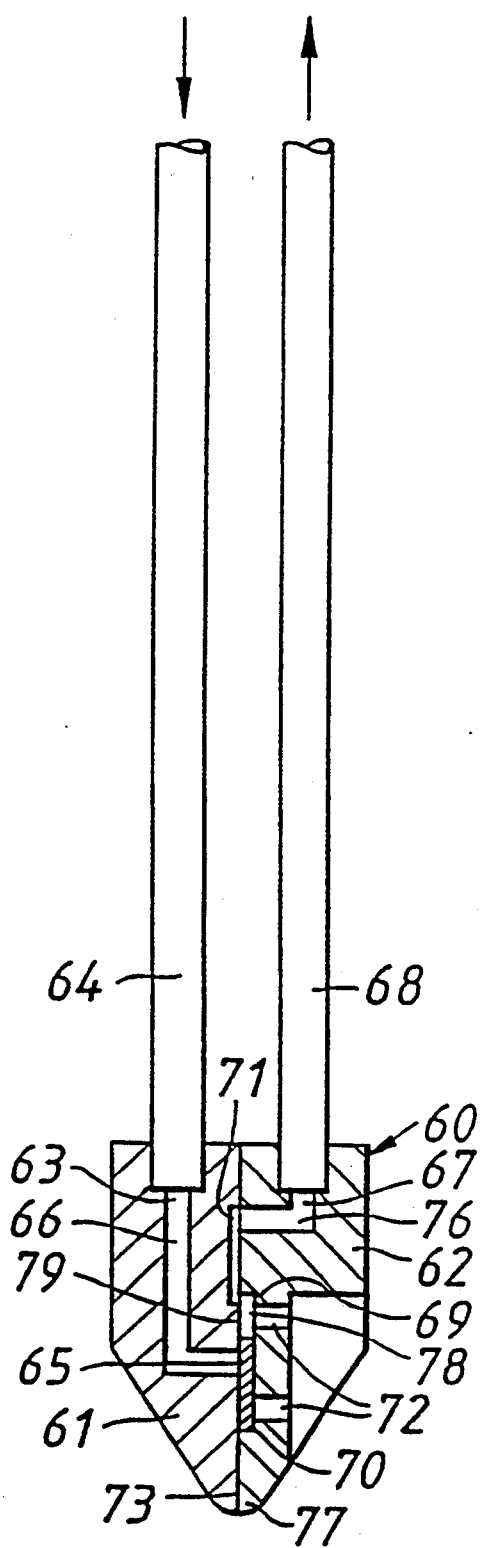
FIG. 8 is a section on D—D of FIG. 7 also showing inlet and outlet tubes.

FIGS. 7 and 8 illustrate a fourth embodiment of a control valve. In this embodiment, valve 60 comprises two body portions 61 and 62 joined together at faces 73 and 77 respectively. A first body portion 61 has an inlet 63 (shown attached to an inlet tube 64). The inlet 63 is connected to an inlet port 65 by a passageway 66, the inlet port 65 lying in the joining face 73 with the second body portion 62. Also in this face 73 there is provided a groove 71.

The second body portion 62 has an outlet 67 (shown connected to an outlet tube 68). The outlet 67 is connected by a passage 76 to the joining face 77 of the second body portion 62 into which it opens. Also the face 77 contains a cavity 78 for housing a disc of hydrogel 70 as used in the previous Figures. Also this cavity 78 is provided with apertures 72 to connect the cavity to the exterior of the valve.

To construct the valve, a water impermeable film 79 is placed across the cavity 78 with the hydrogel disc 70 already in place, and then the two body portions 61 and 62 are sealed or welded together at faces 73 and 77, the inlet port 65 and part of groove 71 being opposite cavity 78 and film 79 and the outlet passage 76 connecting with groove 71.

When, in use, the hydrogel disc 70 is caused to swell by environmental moisture entering cavity 78 through apertures 72, the film 79 is pressed down across the inlet port 65 to close the valve. At the hydrogel 70 contracts, the pressure on film 79 is reduced and fluid is able to flow from inlet port 65, under film 79 into groove 71 and thus to the outlet.

Apart from use as a water flow controller in plant growing systems, the valve could also be used in plant pots for indoor plant cultivation.

Also, the valve may be used as a water level controller, for example in a cistern. In such an arrangement, the valve may be fixed to the side of the cistern at an appropriate level and as the water level rises, it causes the hydrogel to swell shutting off the inlet to the cistern.

Figure 9:
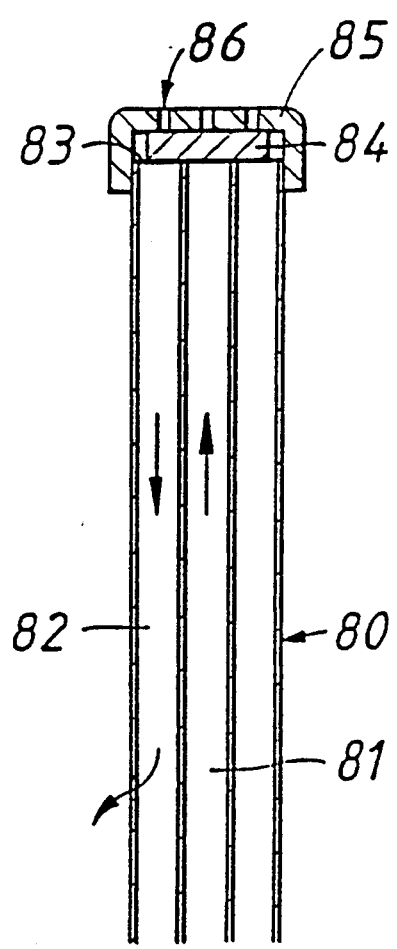
FIG. 9 is a section of a fifth embodiment of a control valve according to the invention.

FIG. 9 illustrates a fifth embodiment of valve according to the present invention. This embodiment is particularly suitable for minaturisation.

In this embodiment there is provided concentric tubing 80, as for example is known for use as a catheter tubing. The inner tube 81 is the inlet tube and the outer tube 82 is the outlet tube (or vice versa). Across the end of the concentric tubing 80 is a water impermeable flexible film 83 which, with a hydrogel disc 84, on top, is held in position by a cap 85, adhered or welding to the tubing 80. The wall of cap 85 contains holes 86 to permit access of environmental moisture to the hydrogel disc 84.

In use swelling, by absorption of environmental moisture, of hydrogel disc 84 forces the film 83 to be pressed down across the end of tubing 80 and fluid is unable to pass from the inner tube 81 to the outer tube 82. When the hydrogel disc 84 contracts by desorption of water, the pressure on film 83 is reduced, then flow between the two tubes 82 and 81 is permitted.

EXAMPLE 1

The effects of incorporating a hydrogel polymer based on crosslinked polyethylene oxide into sand on the development of selected horticultral plants grown under saline conditions has been demonstrated. In separate experiments, the seeds of tomato (*Lycopersicon esculentum*, Mill.), lettuce (*Lactuca sativa*, L) and Cucumber sativus, L) were germinated in sand/hydrogel polymer with added Hoagland nutrient solution (one strength). At cotyledon+first true leaf stage, the plantlets were transplanted into polyethylene growing bags containing a range of sand/hydrogel polymer combinations (sand/polymer, 0/100, 25/75, 50/50, 75/25 & 100/0). Saline solutions containing NaCl, CaCl$_2$ & MgCl$_2$ were prepared as Molar solutions and applied as follows; Control (Hoagland), 2,000, 4,000, 8,000 & 32,000 ppm. Application to the growing bags was made twice per week, alternating with a comparable watering regime. Harvesting was carried out after 14 and 28 days.

The results obtained are shown in Table I below

TABLE I

The effects of hydrogel polymer on root depth (cm/Root), Leaf number, Leaf area (cm$^2$/Leaf), Shoot Dry Weight (g/Shoot) and Shoot Succulence (Fresh Weight/Dry Weight)

| H.P Sp (%) SC* Item (ppm) | Tomato | | | | Lettuce | | | | Cucumber | | | |
|---|---|---|---|---|---|---|---|---|---|---|---|---|
| | 2,000 | 4,000 | 8,000 | 32,000 | 2,000 | 4,000 | 8,000 | 32,000 | 2,000 | 4,000 | 8,000 | 32,000 |
| Root Depth | | | | | | | | | | | | |
| 0 | 103.9 | 92.5 | 84.0 | — | 105.5 | 94.0 | 76.6 | — | 100.8 | 110.0 | 81.0 | 19.7 |
| 25 | 91.7 | 90.0 | 79.5 | 27.2 | 119.4 | 128.5 | 85.8 | — | 111.7 | 121.5 | 98.4 | 43.3 |
| 50 | 122.2 | 115.8 | 104.7 | 45.6 | 123.4 | 116.7 | 80.8 | 59.0 | 113.9 | 125.1 | 75.4 | 38.9 |
| 75 | 104.1 | 119.4 | 112.1 | 57.4 | 125.5 | 123.6 | 88.0 | 57.7 | 120.9 | 104.3 | 83.2 | 54.2 |
| 100 | 115.8 | 85.4 | 82.9 | 28.5 | 141.8 | 131.3 | 124.2 | 66.5 | 101.3 | 103.9 | 79.2 | 42.2 |
| Leaf Number | | | | | | | | | | | | |
| 0 | 113.6 | 106.8 | 100.0 | — | 82.8 | 58.2 | 38.8 | — | 88.9 | 90.5 | 66.7 | 54.0 |
| 25 | 97.7 | 100.0 | 84.6 | 53.9 | 87.3 | 69.0 | 47.2 | — | 90.4 | 83.6 | 76.7 | 60.3 |
| 50 | 102.1 | 100.0 | 83.6 | 64.3 | 91.2 | 89.8 | 68.7 | 38.8 | 120.6 | 114.3 | 106.4 | 74.6 |
| 75 | 105.0 | 102.1 | 96.7 | 62.1 | 120.5 | 100.0 | 70.5 | 37.5 | 123.4 | 114.1 | 101.6 | 75.0 |
| 100 | 108.3 | 97.5 | 95.5 | 60.8 | 105.1 | 88.9 | 83.8 | 46.2 | 121.9 | 112.5 | 95.3 | 75.0 |
| Leaf Area | | | | | | | | | | | | |
| 0 | 111.6 | 96.9 | 94.7 | — | 36.3 | 17.4 | 7.3 | — | 120.0 | 82.3 | 72.9 | 22.3 |
| 25 | 79.1 | 64.6 | 62.1 | 12.9 | 63.7 | 29.2 | 21.8 | — | 138.6 | 130.6 | 102.2 | 56.8 |
| 50 | 123.1 | 92.3 | 63.1 | 15.4 | 71.5 | 91.8 | 58.7 | 16.3 | 94.6 | 85.6 | 103.6 | 34.2 |
| 75 | 92.3 | 91.4 | 96.4 | 25.0 | 91.3 | 67.2 | 31.0 | 15.5 | 128.6 | 90.5 | 87.6 | 32.4 |
| 100 | 84.3 | 80.8 | 70.0 | 12.8 | 111.6 | 98.1 | 38.5 | 19.2 | 100.0 | 109.5 | 87.6 | 29.5 |
| Shoot Dry Weight | | | | | | | | | | | | |
| 0 | 115.0 | 70.0 | 65.0 | — | 31.2 | 18.8 | 12.5 | — | 64.7 | 60.8 | 51.0 | 21.6 |
| 25 | 96.0 | 80.0 | 60.0 | 8.0 | 86.7 | 69.2 | 36.7 | — | 109.5 | 81.0 | 59.1 | 28.6 |
| 50 | 118.2 | 72.7 | 45.5 | 13.7 | 81.3 | 78.1 | 37.3 | 6.3 | 109.3 | 102.8 | 83.3 | 29.6 |
| 75 | 84.0 | 72.0 | 68.0 | 12.0 | 71.4 | 48.6 | 14.3 | 5.7 | 114.4 | 118.6 | 66.1 | 28.0 |
| 100 | 96.4 | 71.4 | 60.7 | 10.7 | 145.5 | 100.0 | 45.5 | 9.1 | 108.0 | 102.9 | 93.5 | 22.5 |
| Shoot Succulence | | | | | | | | | | | | |
| 0 | 93.8 | 108.9 | 115.2 | — | 92.6 | 77.3 | 104.2 | — | 88.6 | 115.5 | 100.0 | 103.3 |
| 25 | 118.8 | 100.0 | 96.4 | 89.3 | 60.3 | 43.6 | 71.6 | — | 88.0 | 90.0 | 84.0 | 71.3 |
| 50 | 96.0 | 122.2 | 119.1 | 67.5 | 54.3 | 92.3 | 78.3 | 106.8 | 121.7 | 108.5 | 113.2 | 94.3 |
| 75 | 104.4 | 118.5 | 94.1 | 108.9 | 96.1 | 95.7 | 121.7 | 108.7 | 133.3 | 112.2 | 119.3 | 124.6 |
| 100 | 107.4 | 103.3 | 116.5 | 47.9 | 98.6 | 96.7 | 76.8 | 94.8 | 104.1 | 107.3 | 95.8 | 110.6 |

H.P. = Hydrogel Polymer. Sp = Species. SC* = Salinity Concentrations (ppm)
Molar equivalent 6.0 × 10$^{-2}$, 1.2 × 10$^{-1}$, 2.4 × 10$^{-1}$ & 9.6 × 10$^{-1}$ respectively.

Polymer incorporation encouraged growth of all species under all saline conditions, the order of effectiveness of the polymer contents being as follows: 75%>50%>25%>100%>0%. At high salinity (32,000 ppm) plants of the test species were reduced in growth but appeared to tolerate at all levels of polymer incorporation; in pure sand the level of tolerance in tomato and cucumber was <8,000 ppm and in lettuce <4,000 ppm. Generally, root depth, dry weight, leaf area and number, succulence, chloroplast pigments (chlorophyll a, chlorophyll b & carotenoids), photosynthetic activity, total amino acids, proline, hydroxyproline and protein contents were increased with polymer incorporation compared with pure sand. The hydrogel polymer appears to be highly effective for use as a soil conditioner in horticulture, to improve crop tolerance and growth in a sand or light gravel substrate under saline conditions.

EXAMPLE 2

In this example poly(ethylene oxide) hydrogel was used to grow a crop of tomatoes (cultivar 'Counter') to maturity under a range of salinity regimes. In this case hydrogel alone and in combination with varying proportions of sand was contained in woven polyester bags having a nominal rooting volume of c. 8.3 liters per plant. Young plants, propagated solely in hydrogel contained in cellular trays, were irrigated with a complete nutrient solution of equal parts A & B (See Table 2 below) diluted to an applied conductivity of CF 15. These plants were placed in the final growing medium at the 2-3 true leaf stage. Hydrogel: Sand ratios of 100:0, 75:25, 50:50, 25:75 and 0:100 were utilised. Irrigation solution available to plants was of equal parts A & C (Table 2) diluted to a conductivity of CF 20 and supplemented with either 0, 2,000 or 8,000 parts per million (ppm) NaCl. Plants were maintained in an east-west oriented glasshouse with a heating thermostat setpoint of 18° C., ventilation set point 24° C.

The fruit yield is given in Table 3 below. While yield is significantly reduced by increasing salinity the presence of hydrogel can significantly moderate this, giving a consequent increase in yield. Yield increases were significant at both 100% and 75% hydrogel and plant survival at high salinity was generally improved. Benefits of hydrogel incorporation below this level were smaller, but nonetheless apparent.

This feature of salinity moderation was supported by other observations of leaf number, plant height and flower branch ("truss") number, in which the effect of salinity is reduced to a statistically significant extent in all cases where gel was incorporated to a level of 50% or more at the root zone. In a "field scale" this would equate to below 1% of soil volume depending on local soil conditions.

TABLE 2

NUTRIENT COMPONENTS FOR LOW AND HIGH N SOLUTIONS

|   |   | Mass (g/liter) | Total Element Concentration (ppm) When Diluted 1/1000 | |
|---|---|---|---|---|
| A. | Calcium nitrate | 40 | Ca68 | $NO_3$-N47 |
| B. | Potassium sulphate | 28 | K126 | |
|   | Potassium nitrate | 21 | K 80 | $NO_3$-N28 |
|   | Mono-amm. phosphate | 7.5 | $NH_4$-N9 | P20 |
|   | Magnesium sulphate | 19 | Mg19 | |
|   | Iron EDTA | 1/78 | Fe 2.4 | |
|   | Manganese sulphate | 0.31 | Mn 0.76 | |
|   | Borax | 0.21 | B 0.27 | |
|   | Ammonium Molybdate | 0.012 | Mo 0.05 | |
| C. | Potassium nitrate | 59 | K224 | $NO_3$-N77 |
|   | Mono-amm. phosphate | 14 | $NH_4$-N17 | P38 |
|   | Magnesium sulphate | 19 | Mg19 | |
|   | Iron EDTA | 1.78 | Fe 2.4 | |
|   | Maganese sulphate | 0.31 | Mn 0.76 | |
|   | Borax | 0.21 | B 0.27 | |
|   | Ammonium Molybdate | 0.012 | Mo 0.05 | |

TABLE 3

Mean numbers of tomato fruit produced 23 weeks after sowing

| ppm NaCl | % Hydrogel | | | | |
|---|---|---|---|---|---|
|   | 100 | 75 | 50 | 25 | 0 |
| 0 | 21.0±2.0 | 21.3±3.9 | 11.0±0.5 | 13.3±1.6 | 15.7±1.2 |
| 2000 | 19.3±1.7 | 16.2±1.3 | 12.2±0.8 | 4.2±1.0 | 0±0 |
| 8000 | 6.5±1.7 | 0±0 | 2.0±1.2 | 0±0 | 0±0 |

We claim:

1. A method of plant growing in which method one or more plants are grown in a growing medium comprising particles of partially crystalline, cross-linked polyethylene glycol or polyethylene oxide hydrogel, obtained by reaction of polyethylene glycol or polyethylene oxide, respectively, with a polyisocyanate and optionally another polyol, charged with aqueous nutrient solution for the plant or plants, the growing medium being housed in a container composed of a substantially water-impermeable material and the plants extending out of the container, and, when the water content within the hydrogel particles falls below a predetermined level, introducing further nutrient solution into the container.

2. A method of growing plants, in which method one or more plants are grown in a growing medium comprising particles of partially crystalline, cross-linked polyethylene glycol or polyethylene oxide hydrogel, obtained by reaction of polyethylene glycol or polyethylene oxide, respectively, with a polyisocyanate and optionally another polyol, charged with aqueous nutrient solution for the plant or plants wherein the aqueous nutrient solution comprises sea water.

3. A method according to claim 1 or 2 wherein the growing medium comprises hydrogel particles and nutritionally inert particles.

4. A method according to claim 1 or 2 wherein the growing medium comprises 0.5 to 100% weight cross-linked polyethylene glycol hydrogel particles and 0 to 99.5% by weight nutritionally inert particles and has a moisture tension of −0.01 MPa to −0.03 MPa.

5. Apparatus for use in plant cultivation which apparatus comprises a water-impermeable container housing a plant growing medium comprising particles of partially crystalline, cross-linked polyethylene glycol or polyethylene oxide hydrogel, obtained by reaction of polyethylene glycol or polyethylene oxide, respectively, with a polyisocyanate and optionally another polyol, a supply line for feeding nutrient solution to the growing medium in the container, and a valve in the supply line, which valve is closed when the water content of the hydrogel particles is above a predetermined level and is open when the water content is below the predetermined level.

* * * * *